Jan. 5, 1960 J. H. BRUNDAGE 2,920,291

SIGNAL TRANSMISSION SYSTEMS

Filed March 6, 1956 2 Sheets-Sheet 1

INVENTOR
JOHN H. BRUNDAGE
BY *Lucy P. Lantzy*
ATTORNEY

INVENTOR
JOHN H. BRUNDAGE
BY Percy P. Lantzy
ATTORNEY

United States Patent Office 2,920,291

Patented Jan. 5, 1960

2,920,291

SIGNAL TRANSMISSION SYSTEMS

John H. Brundage, West Caldwell, N.J., assignor to International Telephone and Telegraph Corporation, Nutley, N.J., a corporation of Maryland Application March 6, 1956, Serial No. 569,746

3 Claims. (Cl. 333—14)

This invention relates to signal transmission systems and more especially it relates to such systems employing volume compressors and correlated volume expanders.

A principal object of the invention is to provide a novel correlated volume compressor and volume expander combination, whereby a substantial improvement is obtained in the effective signal-to-noise ratio in the signal transmission between two points.

Another object is to provide a novel compandor employing passive non-linear asymmetrical elements as variolosser controls, as distinguished from the use of electron tubes for variolosser devices.

A further object is to provide a novel compandor employing contact diodes as the passive control elements of the variable loss networks of the compressor and expander sections of the compandor.

A still further object is to provide a compandor system employing contact diodes of the germanium crystal kind as variolossers, in conjunction with associated circuit connections whereby substantial linearity of correlative matching is obtained between the volume compressor and the volume expander sections, and without the necessity of using crystal diodes of extremely close tolerances with respect to their charatceristic curves of current versus resistance.

A feature of the invention relates to a variolosser employing a crystal contact diode which has substantial variation in its resistance-current characteristic with respect to temperature and at low level of input signal, in conjunction with a series resistor for more precisely controlling the dynamic characteristics of the variolosser.

Another feature relates to a variolosser of the kind employing contact crystal diodes as the variolosser element, in conjunction with a special biasing arrangement for the diodes to compensate for the variation of the non-linear characteristic of the diode at low signal input levels.

A further feature relates to a novel compandor employing a variolosser in the compressor section, which includes a plurality of contact diodes of the germanium crystal kind connected in balanced relation to a signal input source and having the output of the compressor connected in feedback relation to the variolosser, and in which the expander employs a variolosser also including a plurality of contact diodes of high conductivity germanium or high conductivity silicon in conjunction with a special biasing arrangement for correlatively matching the characteristics of the compressor and expander.

A still further feature relates to the novel organization, arrangement and relative location and interconnection of parts which in cooperating provide an improved compandor employing varistors of the contact crystal kind.

Other features and advantages not particularly enumerated will be apparent after a consideration of the following detailed descriptions and the appended claims.

In the drawing.

Throughout the various figures of the drawing the same numerals are used to indicate parts which are identical or function identically.

Figure 1:
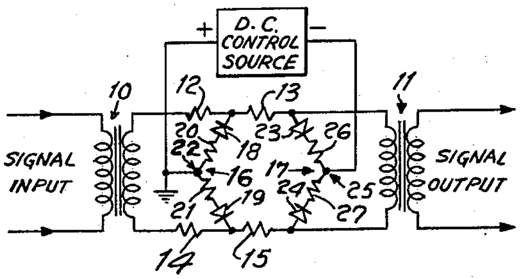
Fig. 1 shows in schematic form a volume compressor according to the invention.

Various forms of compandors have been proposed heretofore wherein the variolosser control elements consisted mainly of electron tubes. While such compandors serve their particular purposes very well, they have the drawbacks which are inherent in any control system using electron tubes. One of the advantages of using electron tubes in a conventional compandor is that because of the considerable number of parameters that may be varied, such as gain control, possibility of using tubes of widely different characteristics, etc. it is not too difficult to match the compressor to the expandor. However with the advent of passive asymmetric devices of the contact crystal kind, such for example as the well known silicon diodes 1N82A and the well known germanium diodes, for example type 1N34A, attempts have been made to design satisfactory compandors using such contact diodes in place of electron tubes because of certain desirable properties of such contact crystal diodes. Nevertheless because of other peculiar characteristics of such diodes and the limited control over the electrical parameters thereof, they have not been found entirely satisfactory for use in a compandor system.

For example, while diodes of the silicon kind have relatively low variation of current resistance characteristic with temperature, they are not entirely suitable for use in the compressor section. On the other hand, I have found that diodes of the germanium crystal kind can be satisfactorily used in compandors providing some means are used to automatically control the dynamic variable loss effects in the proper way. While the germanium diode is peculiarly advantageous in a volume compressor, nevertheless it has the drawback that its forward current-passing characteristic, particularly at low input signal levels, is excessively variable with variable ambient temperature. Furthermore, the general shape of the forward characteristic of the germanium diode in this low level input region was found to depend primarily upon the conductivity characteristics of the germanium used in the diode. This dependence was also found to be such that many of the commonly available germanium crystal diodes were unsuitable in a compandor. That necessitated the testing and discarding of a considerable number of germanium diodes which did not meet the required tolerances necessary for use in a compandor. Obviously that condition increased the cost of manufacture of a suitable compandor.

I have found that by associating with the germanium crystal diode fixed circuit elements with predetermined parameters, it is possible to build a satisfactorly compandor using germanium crystal diodes of relatively widely different conductivity characteristics.

In considering amplitude distortion in a variolosser network, there are three considerations which influence the configuration of the circuit, (1) the control current in the varistors should increase with increasing signal current; (2) the signal current in the varistor should be small with respect to the control current; (3) a plurality of varistors should be connected in push-pull relation to minimize the effects of operation on a non-linear characteristic.

In accordance with this invention, the variolosser network comprises a balanced ladder-type network employing series arms and shunt arms, the series arms being constituted of fixed resistances and the shunt arms being constituted of varistors of the contact diode kind connected back-to-back. This network is provided with a direct current control voltage preferably derived from the output of the variolosser and applied at the junctions of the varistors. I have also found that by connecting a resistance in series with each contact diode in the variolosser, it is possible to provide the proper accurate correlative matching of the compressor and expander sections. In fact I have found that it is desirable to provide the compressor with an upward concave portion in its characteristic curve (that is, the curve relating input level to output level) at the higher level end of the range to be transmitted.

Such an arrangement is shown schematically in Fig. 1 of the drawing. It comprises a signal input represented by the input transformer 10 and a signal output represented by the output transformer 11. Connected between the input and output is a variolosser according to the invention and comprising the series arms constituted of the resistors 12, 13 and 14, 15 and the shunt arms 16, 17. The shunt arm 16 consists of a pair of germanium crystal diodes 18, 19 such for example as diode types 1N34A connected back-to-back and through respective resistors 20, 21 whose junction point 22 is connected to ground. Similarly the shunt arm 17 consists of germanium crystal diodes 23, 24 connected to a junction point 25 through respective resistors 26, 27. The function of the resistors 20, 21 and 26, 27 is to impart a small concave upward curvature to the compression characteristic at the higher levels of input signal. This was found necessary in order to provide a more accurate match to the expander characteristics at the corresponding levels.

Figure 2:
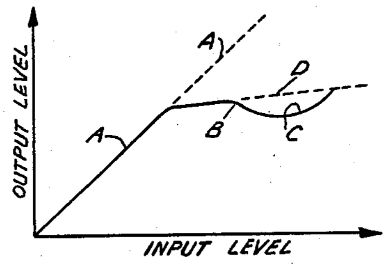
Fig. 2 is a graph showing the compression characteristics of the compressor of Fig. 1.

Fig. 2 shows a typical graph giving the relation between relative input level and relative output level of the compressor of Fig. 1. Without any compression the relation between input and output levels would be represented by the straight line A. With a compressor such as shown in Fig. 1 the compression is represented by the line B which has the desired concave-upward portion C referred to above. Without the resistors 20, 21 and 26, 27 the compression would be that represented by the dotted line D, which would not enable the compressor to be accurately matched to the expander.

Figure 3:
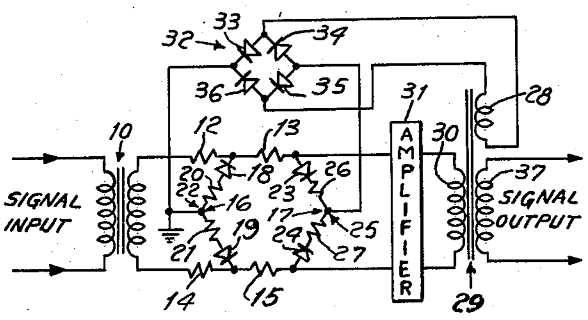
Fig. 3 is a schematic diagram of a modification of Fig. 1.

It was found that when a compressor such as shown in Fig. 1 was tested with a direct current control derived from an adjustable battery source, the results were very satisfactory over a reasonable range of control currents, but the compressor departs from the desired performance at very small values of control current. Referring now to Fig. 3, it was found that when the output of the compressor of Fig. 1 is connected to a suitable amplifier and a portion of the amplified output is fed back through a balanced rectifier network employing crystal contact rectifiers 28, 29, 30 and 31 to the junction points 22 and 25, and by proper choice of the circuit parameters, the above-noted departure is overcome.

As shown in Fig. 3, the direct current control voltage which is applied across the junction points 22 and 25 of the compressor instead of being an adjustable battery consists of a supplemental secondary winding 28 on the signal output transformer 29. The primary winding 30 of this transformer is connected to the output of a suitable amplifier 31 whose input is connected through the variolosser network to the secondary winding of the signal input transformer 10. The supplemental secondary winding 28 is connected through a full wave balanced rectifier network 32 comprising crystal diodes 33, 34, 35 and 36 and thence across the junction points 22 and 25. The main portion of the signal output is applied to the transmission channel through the output winding 37 of the output transformer 29. Thus advantage is taken of the fact that the efficiency of the control rectifier 32 diminishes towards zero at small signal levels. By this particular combination, therefore, it was found that the operating range of the compressor of Figs. 3 can be extended to cover 60 db change in input signal level. This was also achieved while maintaining a very close match to the ideal compression curve which should have a slope of 0.50 when plotted on logarithmic coordinates.

Figure 4:
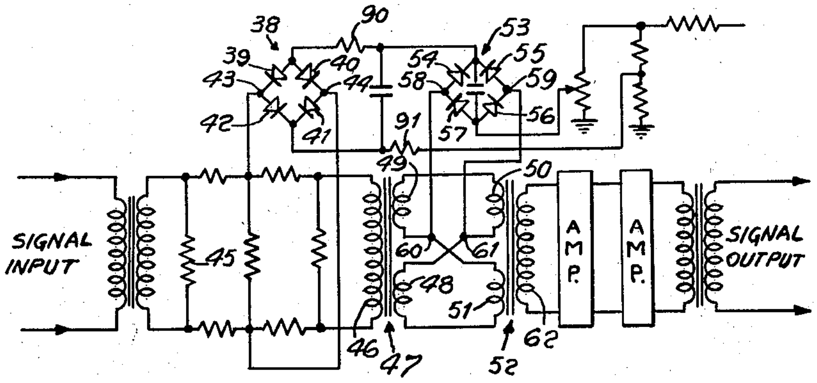
Fig. 4 is a schematic diagram of a volume expander according to the invention.

As is well known, it is necessary to employ in conjunction with the compressor a volume expander so as to restore the proper balance and naturalness of the sound, especially when the signals to be transmitted are speech signals. I have found that it is possible to provide a satisfactory volume expander for that purpose using for the variolosser, passive rectifiers of the contact crystal kind. Such an expander is schematically illustrated in Fig. 4. The input to the expander of Fig. 4 is received from the output of the compressor of Fig. 3. Part of that input is applied through a control rectifier 38 consisting of a set of four germanium crystal diodes 39, 40, 41, 42, with the crystals connected as shown in Fig. 4. The junction points 43, 44 are connected, respectively, across opposite sides of the input circuit, preferably through a resistance attenuation pad 45. Another portion of the input signal is applied to the primary winding 46 of a transformer 47 having a pair of secondary windings 48, 49. The windings 48, 49 are connected in cross-looped arrangement with a pair of primary windings 50, 51 of a coupling transformer 52. Connected in circuit with the rectifier network 38 and the transformers 47 and 52 is a variolosser 53 comprising four contact crystal diodes 54, 55, 56 and 57 connected as shown in Fig. 4. The junction point 58 between the diodes 54 and 57 is connected to the lower end of the transformer winding 49. Likewise, the junction point 59 between the diodes 55 and 56 is connected to the lower end of the transformer winding 50. The windings 48–51 are so related in impedance to the variolosser 53 that when the impedance across points 60 and 61 is large the voltage in the two windings 48 and 49 are in opposition because of the cross-connection with the windings 50 and 48. In that case only a small residual voltage is developed in the output winding 62 and therefore the insertion loss of the variolosser is large.

On the other hand, when the impedance across the points 60 and 61 is small, the voltage in the two windings 48 and 49 add together in the corresponding cross-connected windings 50, 51, resulting in a large signal voltage appearing at the output winding 62. In other words, the insertion loss of the variolosser is then small.

The circuit for the variolosser is arranged so that high level input signals received from the compressor cause the variolosser diodes 54–57 to have a low forward resistance, thus providing a small insertion loss; while with low level input signals from the compressor, the impedance of the variolosser 53 and the resulting insertion loss are high. By proper proportioning of the circuit parameters it is possible to make the variolosser output to vary approximately 2 db for each 1 db change in input signal level, thus providing the desired expander action.

Figure 5:
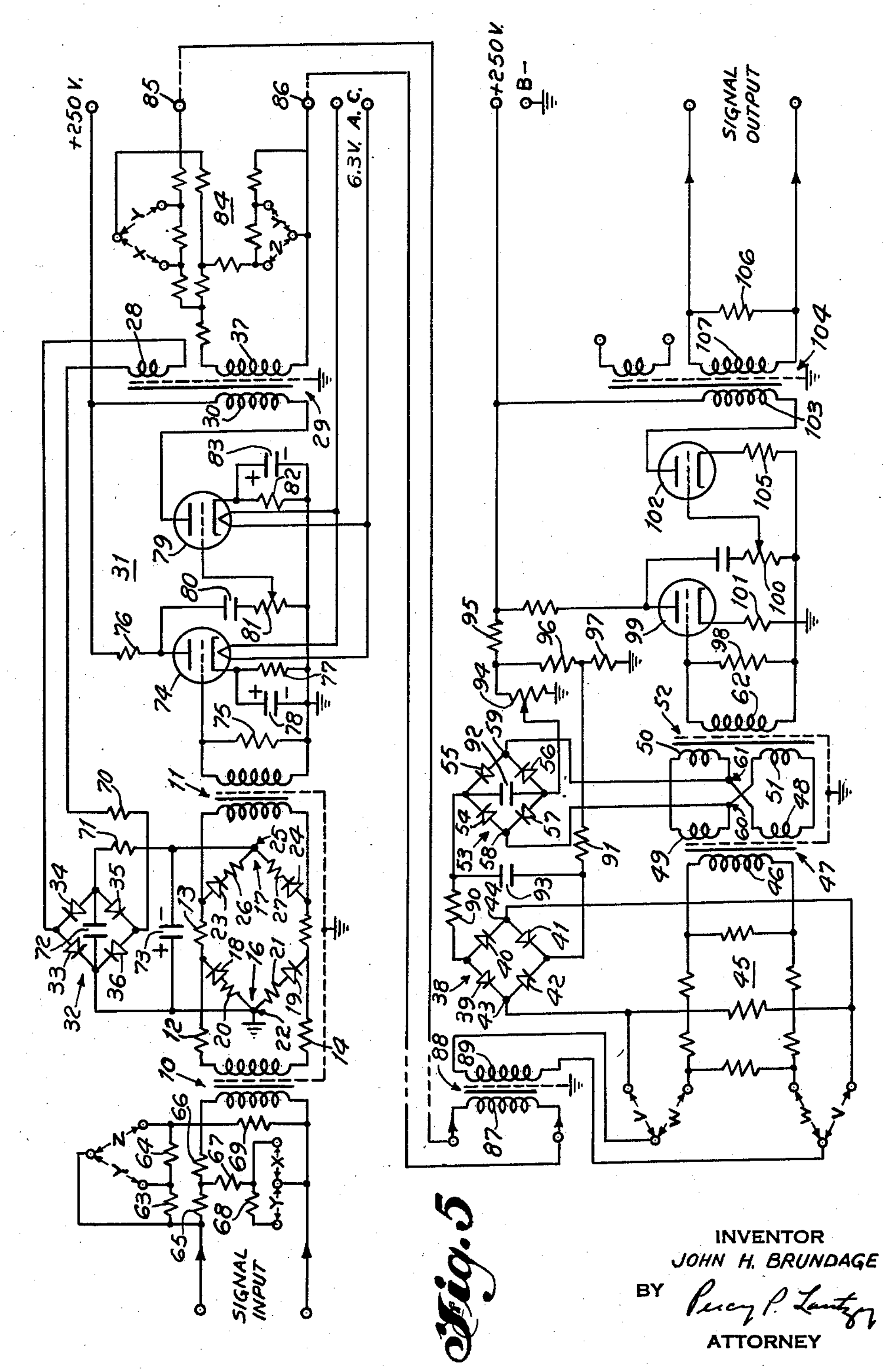
Fig. 5 is a complete schematic wiring diagram of a compandor system embodying the invention.

Referring to Fig. 5, there is shown in more complete form a combined compressor and expander system embodying the features hereinabove described. The signal input may be applied to a suitable bridged T input attenuator including the resistors 63 to 68 which can be strapped in various combinations as represented by the alternative connections *x*, *y*, *z*, to provide, for example, attenuation values of 12 db, 3 db and 0 db, corresponding to input levels −4 db, −13 db and −16 db, respectively. By this arrangement the lineup level applied to the primary winding of the input transformer 10 is thus −16 dbm for each of the above-noted input levels. A resistance 69 can be connected in parallel with the primary winding of transformer 10 to help stabilize the input impedance of the variolosser. The input signals are then applied to the variolosser network consisting of resistances 12, 13, 14 and 15, together with the crystal diode units 18, 19, 23 and 24 and their respective series resistors 20, 21, 26 and 27. As hereinabove noted, the resistors 20, 21 and 26, 27 in series with the crystal diodes provide the desired small concave upward curvature C (Fig. 2) to the compressor characteristic at the higher input levels.

The control current for the variolosser is applied from the feedback winding 28 of the transformer 29 through the control rectifier bridge 32 consisting of crystal diodes 33–36. Resistors 70, 71 together with capacitors 72, 73 filter the control current and determine the attack and release timing of the variolosser giving it its desired syllabic response characteristics.

The output voltage of the variolosser appears across the primary winding of the transformer 11. The secondary winding of that transformer is connected to the grid of a grid-controlled vacuum tube amplifier 74 of any well known kind. A shunt resistance 75 is connected across the secondary winding of transformer 11 so as to provide a compromise between variolosser action and frequency response. The amplifier tube 74 may be a conventional voltage amplifier stage using a resistance 76 as its plate load resistor. Resistor 77 and capacitor 78 establish the desired grid to cathode bias for this amplifier stage. The output of amplifier 74 is coupled to the control grid of another grid-controlled amplifier tube 79 through the coupling network comprising capacitor 80 and gain control potentiometer 81. Tube 71 may be a power output stage with its plate load constituted by the primary winding 30 of transformer 29. Resistor 82 and capacitor 83 establish the correct grid to cathode bias for the tube 79. The output of tube 79 is coupled through the secondary winding 37 and thence through a suitable output attenuator 84 to the signal output terminals 85, 86. The supplemental secondary winding 28 is connected to the full wave balanced rectifier 32.

The optimum operating point for the compressor variolosser may correspond, for example, to a signal level of 2.3 volts across 800 ohms and across the output winding 37, when −16 dbm signal is applied to the input winding 30. The output attenuator 84 may be strapped as schematically represented by the connections *x*, *y* and *z* to provide levels of −1.5, −10.5, and 013.5 dbm, corresponding to test levels of −4, −13 and −16 dbm. Thus the compressor provides an insertion gain of 2.5 db at normal test level. This corresponds to providing the compressor with zero insertion gain at signal equivalent to +5 dbm at the signal input to the compressor.

Returning to the variolosser network, it will be seen that at very low values of input signal level the control current resulting from the amplifier 32 and flowing in the crystal diodes 18, 19, 23 and 24, is negligible. The forward resistance of these crystal units is thus large and since they are in shunt across the transmission circuit, the insertion loss of the network is a minimum. On the other hand, at large signal input levels, the control current supplied by the rectifier 32 is large and the forward resistance of the crystal diode units 20, 21, 23 and 24 is small, thus causing the insertion loss of the variolosser to be a maximum. Since the control current is derived from the amplifier output, it can be seen that the action of the variolosser is to substantially reduce, in the output signals, the range of level variation which exists in the input signals. By properly proportioning the circuit parameters this output level variation is caused to be approximately 1 db for each 2 db variation in input signal.

The compressed signals at the output terminals 85, 86 may be transmitted over any suitable transmission medium, for example over a carrier telephone line or the like, by conventional carrier modulation methods. These modulated carrier signals are then received by the receiver and after suitable demodulation are applied to the input winding 87 of a suitable transformer 88 whose secondary winding 89 is connected to an attenuator network 45 which can be selectively strapped, as indicated schematically by the letters *v* and *w*, so as to provide losses of 0 db and 3 db corresponding to nominal test levels of +4 db and +7 db, respectively. The actual signal levels applied may be +6.5 and +9.5 dbm, respectively, corresponding to the 2.5 db gain of the compressor at normal test level. These input signals are then split into two branches of the variolosser, part being applied to the control rectifier 38 and the remaining part passing through the attenuator 45 to the primary winding 46 of the variolosser transformer 47.

The output of the rectifier bridge 38 can be filtered by resistors 90 and 91 and capacitors 92, 93 which establish the attack and release timing of the expander variolosser. The filtered current from the rectifier 38 is then applied to the crystal diodes 54–57 of the variolosser. A small positive bias voltage derived from the plate current power supply is developed across the network consisting of resistors 94, 95, 96, 97 and is applied to the diodes of the variolosser 53 to compensate for variation in those diodes at low input signal levels. The adjustment of resistor 94 can be made at the time of installation and ordinarily need not be changed subsequently unless the diodes of the variolosser are replaced.

When the impedance across the terminals 60, 61 of the variolosser transformer windings 49 and 50 is large, the voltages in the two secondary windings 48, 49 are in opposition through the corresponding windings 50 and 51, and only a small residual voltage is developed in the output winding 62. When the impedance across points 60 and 61 is small, the insertion loss of the variolosser is also small. Thus the variolosser circuit is so arranged that large input signals across the variolosser diodes 54–57 cause those diodes to have a low forward resistance to provide a small insertion loss, while with small input signals the diode impedance and resulting insertion loss are high.

A suitable resistor 98 may be provided for the proper impedance termination of the variolosser. The voltage developed across resistor 98 can be applied to the grid of a grid controlled amplifier tube 99 operating as a conventional voltage amplifier stage. Resistor 100 may constitute the plate load resistance for tube 99 and resistor 101 may provide the correct bias for tube 99. The output of tube 99 may then be applied to the control grid of a power amplifier tube 102 whose plate load is constituted of the primary winding 103 of a suitable signal output transformer 104. The correct bias for the grid of tube 102 may be provided by the resistor 105. A shunt resistor 106 may be connected across the transformer secondary 107 to stabilize the load impedance presented to tube 102 by the transformer 104.

Preferably all the transformers 10, 11, 29, 88, 47, 52 and 104 are of the shielded type, which shield is schematically represented in the drawing by the dotted lines and connected to ground. The foregoing system provides a high degree of matching of the compressor and expander characteristics which is substantially linear over a relatively wide temperature range. With variations of ambient temperature it is found that although both the compressor and expander may be subjected to individual variations, these effects are compensated so that the over-all characteristic is virtually unaffected. Frequency response tests showed that the frequency response does not vary from flatness by more than 0.80 db between the ranges 300 and 4000 c.p.s. at normal signal levels. It was found that with commonly encountered values of circuit noise, a reduction of approximately 30 db in intersyllabic noise is obtainable.

Various changes and modifications may be made in the disclosed embodiments without departing from the spirit and scope of the invention.

What is claimed is:

1. An amplitude compressor for signal transmission systems comprising first and second input terminals; first and second output terminals; a first circuit including first and second resistors coupled in series between said first input terminal and said first output terminal; a second circuit including third and fourth resistors coupled in series between said second input terminal and said second output terminal; a third circuit including a first crystal contact diode coupled to the junction of said first and second resistors, a second crystal contact diode coupled to the junction of said third and fourth resistors, and fifth and sixth resistors connected in series coupling said first and second diodes in series in a back-to-back relationship; a fourth circuit including a third crystal contact diode coupled to the junction of said second resistor and said first output terminal, a fourth crystal contact diode coupled to the junction of said fourth resistor and said second output terminal, and seventh and eighth resistors connected in series coupling said third and fourth diodes in series in a back-to-back relationship; said first and second diodes being disposed in reverse polarity relation to said third and fourth diodes; said fifth, sixth, seventh and eighth resistors imparting a concave upward portion to the transmission characteristic of said compressor; and a control circuit including means connecting the junction of said fifth and sixth resistors to ground potential, means including a full-wave balanced rectifier coupled to said output terminals to produce a control voltage and means coupling said control voltage between the junction of said fifth and sixth resistors and the junction of said seventh and eighth resistors to vary the resistance of said third and fourth circuits in correlation with the amplitude of the signals coupled to said input terminals.

2. An amplitude expander comprising first and second input terminals, first and second output terminals, a first transformer including a first primary winding and first and second secondary windings, means coupling said first primary winding across said input terminals, a second transformer including second and third primary windings and a third secondary winding, means coupling said third secondary winding across said output terminals, a first conductor coupling one end of said first secondary winding to one end of said second primary winding, a second conductor coupling one end of said secondary winding to one end of said third primary winding, a third conductor coupling the other end of said first secondary winding to the other end of said third primary winding, a fourth conductor coupling the other end of said primary winding to the other end of said secondary winding, four crystal contact diodes connected in a balanced bridge arrangement, the diodes in the first and second arms of said bridge being disposed in a back-to-back relation and the diodes in said third and fourth arms of said bridge being disposed in a back-to-back relation, the diodes of said first and second arms having a polarity opposite to the polarity of the diode of said third and fourth arms, means connecting the junction of said first and fourth arms of said bridge arrangement to said third conductor, means connecting the junction of said second and third arms of said bridge arrangement to said fourth conductor, a bias voltage source, means for applying the voltage of said bias voltage source to the junction of said third and fourth arms of said bridge arrangement to compensate for variations in the characteristics of the diodes of said bridge arrangement at low input signal level, and a control circuit to control the resistance of said bridge arrangement including a bridge rectifier, means coupling one pair of opposite junctions of said bridge rectifier to said input terminal to produce a direct current control voltage varying in accordance with the amplitude of the signal coupled to said input terminal, and means coupling said control voltage to said bridge arrangement to vary the resistance thereof in accordance with said control voltage including means coupling one junction of the other pair of opposite junctions of said bridge rectifier to the junction of said first and second arms of said bridge arrangement and means coupling the other junction of the other pair of opposite junctions of said bridge rectifier in series with said bias voltage source.

3. In a signal transmission system, the combination of an amplitude expander having a given expansion characteristic and an amplitude compressor having a given compression characteristic, said amplitude expander comprising first and second input terminals, first and second output terminals, a first transformer including a first primary winding and first and second secondary windings, means coupling said first primary winding across said input terminals, a second transformer including second and third primary windings, and a third secondary winding, means coupling said third secondary winding across said output terminals, a first conductor coupling one end of said first secondary winding to one end of said second primary winding, a second conductor coupling one end of said second secondary winding to one end of said third primary winding, a third conductor coupling the other end of said first secondary winding to the other end of said third primary winding, a fourth conductor coupling the other end of said winding, a fourth conductor coupling the other end of said secondary primary winding to the other end of said second secondary winding, four crystal contact diodes connected in a balanced bridge arrangement, the diodes in the first and second arms of said bridge being disposed in a back-to-back relation and the diodes in said third and fourth arms of said bridge being disposed in a back-to-back relation, the diodes of said first and second arms having a polarity opposite to the polarity of the diodes of said third and fourth arms, means connecting the junction of said first and fourth arms of said bridge arrangement to said third conductor, means connecting the junction of said second and third arms of said bridge arrangement to said fourth conductor, a bias voltage source, means for applying the voltage of said bias voltage source to the junction of said third and fourth arms of said bridge arrangement to compensate for variations in the characteristics of the diodes of said bridge arrangement at low input signal level, and a control circuit to control the resistance of said bridge arrangement including a bridge rectifier, means coupling one pair of opposite junctions of said bridge rectifier to said input terminal to produce a direct current control voltage varying in accordance with the amplitude of the signal coupled to said input terminal, and means coupling said control voltage to said bridge arrangement to vary the resistance thereof in accordance with said control voltage including means coupling one junction of the other pair of opposite junctions of said bridge rectifier to the junction of said first and second arms of said bridge arrangement and means coupling the other junction of the other pair of opposite junctions of said bridge rectifier in series with said bias voltage source and said amplitude compressor comprising first and second input terminals; first and second output terminals; a first circuit including first and second resistors coupled in series between said first input terminal and said first output terminal; a second circuit including third and fourth resistors coupled in series between said second input terminal and said second output terminal; a third circuit including a first crystal contact diode coupled to the junction of said first and second resistors, a second crystal contact diode coupled to the junction of said third and fourth resistors, and fifth and sixth resistors connected in series coupling said first and second diodes in series in a back-to-back relationship; a fourth circuit including a third crystal contact diode coupled to the junction of said second resistor and said first output terminal, a fourth crystal contact diode coupled to the junction of said fourth resistor and said second output terminal, and seventh and eighth resistors connected in series coupling said third and fourth diodes in series in a back-to-back relationship; said first and second diodes being disposed in reverse polarity relation to said third and fourth diodes; and a control circuit including means connecting the junction of said fifth and sixth resistors to ground potential, means including a full-wave balanced rectifier coupled to said output terminals to produce a control voltage and means coupling said control voltages between the junction of said fifth and sixth resistors and the junction of said seventh and eighth resistors to vary the resistance of said third and fourth circuits in correlation with the amplitude of the signals coupled to said input terminals; said fifth, sixth, seventh and eighth resistors of said compressor imparting a concave upward portion in said given compression characteristic to render said given compression characteristic complementary to said given expansion characteristic and hence said system linear.

References Cited in the file of this patent

UNITED STATES PATENTS

| | | |
|---|---|---|
| 2,003,428 | Cowan | June 4, 1935 |
| 2,066,333 | Caruthers | Jan. 5, 1937 |
| 2,328,951 | Bryant | Sept. 7, 1943 |
| 2,358,045 | Barney | Sept. 12, 1944 |
| 2,438,948 | Riesz | Apr. 6, 1948 |
| 2,548,913 | Schreiner | Apr. 17, 1951 |
| 2,559,023 | McCoy | July 3, 1951 |
| 2,682,640 | Harling | June 29, 1954 |
| 2,697,201 | Harder | Dec. 14, 1954 |
| 2,768,352 | Von Sivers et al. | Oct. 23, 1956 |
| 2,820,949 | Hey | Jan. 21, 1958 |

FOREIGN PATENTS

| | | |
|---|---|---|
| 829,363 | France | Jan. 7, 1944 |
| 1,047,892 | France | July 29, 1953 |